(12) United States Patent
Perchant et al.

(10) Patent No.: US 8,718,398 B2
(45) Date of Patent: May 6, 2014

(54) IMAGE PROCESSING METHOD AND APPARATUS

(75) Inventors: Aymeric Perchant, Fontenay Sous Bois (FR); Nicolas Savoire, Paris (FR)

(73) Assignee: Mauna Kea Technologies, Paris (FR)

( * ) Notice: Subject to any disclaimer, the term of this patent is extended or adjusted under 35 U.S.C. 154(b) by 480 days.

(21) Appl. No.: 13/141,991

(22) PCT Filed: Dec. 28, 2009

(86) PCT No.: PCT/IB2009/008012
§ 371 (c)(1),
(2), (4) Date: Jun. 24, 2011

(87) PCT Pub. No.: WO2010/076662
PCT Pub. Date: Jul. 8, 2010

(65) Prior Publication Data
US 2011/0254980 A1    Oct. 20, 2011

Related U.S. Application Data

(60) Provisional application No. 61/141,151, filed on Dec. 29, 2008.

(51) Int. Cl.
*G06K 9/40* (2006.01)
(52) U.S. Cl.
USPC .......................................... 382/275; 398/136
(58) Field of Classification Search
USPC .......................................... 382/275; 398/136
See application file for complete search history.

(56) References Cited

U.S. PATENT DOCUMENTS 6,307,197 B1 * 10/2001 Krug et al. ............... 250/227.24
2005/0207668 A1   9/2005 Perchant et al.

FOREIGN PATENT DOCUMENTS

| FR | 2 852 394 A1 | 9/2004 | |
| GB | 2 342 524 A | 4/2000 | |
| JP | 61057906 A * | 3/1986 | ............... G02B 6/04 |

OTHER PUBLICATIONS

International Search Report from PCT/IB2009/008012 dated Jun. 18, 2010 (2 pages).

* cited by examiner

*Primary Examiner* — Gregory F Cunningham
(74) *Attorney, Agent, or Firm* — Osha Liang LLP

(57) ABSTRACT

A method to process an image acquired through an optical-fiber guide includes acquiring a first reference image through the optical-fiber guide, acquiring a second calibration image through the optical-fiber guide, spatially identifying each fiber of the optical-fiber guide of the second calibration image in a first detection map, acquiring a recalibration image through the optical-fiber guide, determining a geometrical transformation to make the recalibration image coincide with the first reference image, deriving a new detection map spatially identifying each fiber of the optical-fiber guide of the recalibration image, wherein the new detection map is derived using the geometrical transformation and the first detection map, and individually processing zones of an acquired image corresponding to each fiber of the optical-fiber guide using the new detection map.

22 Claims, 13 Drawing Sheets

IMAGE PROCESSING METHOD AND APPARATUS

BACKGROUND OF THE DISCLOSURE

1. Field of the Disclosure

The present disclosure relates generally to a method for processing an image acquired by means of a guide consisting of a plurality of optical fibers.

2. Description of the Related Art

Most systems for acquiring images with a fiber bundle image guide generally comprise a light source, a charge coupled device ("CCD") detector and possibly a processing device for processing the acquired image. Other systems include a scanning device for scanning the proximal end of the fiber bundle, a receiver and a processing device for processing the acquired images. Image guides allow the CCD or the scanning device, the light source and the receiver to be shifted well away from the object which is to be observed. For example in a laser scanning system in which a confocal image is obtained, the image guide is an assembly of several thousand optical fibers whose spatial arrangement is identical at the entrance (generally referred to as proximal end) and at the exit (generally referred to as distal end).

Because of the loss of information due to the interstices between the optical fibers, processing of the acquired image and particularly image reconstruction is especially important. Indeed, the display is hampered because of the presence of the optical fibers pattern which appears on the acquired image. Patent application US2005/0207668 from the Applicant describes a process so as to eliminate this pattern and to take into account parasite effects by processing individually each zone of the acquired image associated with an optical fiber, Parasite effects arise from different causes, for example from Raman diffusion, from parasite reflections within the system, from fibers transmission heterogeneity, or in the case of fluorescence imaging, from fibers autofluorescence. In order to take into account parasite effects, patent application US2005/0207668 proposes a calibration process implemented through acquiring and processing several reference images in specific media. This process aims notably at determining calibration coefficients per fiber relative to each fiber specific properties.

Scanning of the bundle proximal end results at the distal end in a transposed scanning of an object under observation. As a consequence, the observed object emits light from the scanning which is transported via the fibers to a detector. Under certain conditions, for example low crosstalk and specific injection settings, the information content of each fiber does not depend on the neighboring fiber but only on the spatial coherence of the observed object. Each pixel of an acquired image corresponds to light stemming from the observed object transported via a determined fiber. Thus, it is possible to identify on an image groups of pixels associated to a fiber.

Determining per fiber calibration coefficients from reference images requires to associate pixels of a reference image to fibers of the bundle. This stage may, for example, be carried out by acquiring a reference image taken in a specific medium and by isolating on the image zones corresponding to each optical fiber. This geometrical detection of the fibers enables particularly to finely detect which fiber of a bundle is associated to a pixel of an acquired image.

Calibration relies on analyzing fiber per fiber response to acquired images in specific media and thereby depends on fibers geometrical detection. Calibration aims notably at compensating for defects independent from the imaged object properties. For example, in the case of fluorescence imaging, it allows compensating for defects arising from background fluorescence due to fibers autofluorescence. It enables also to take into account background noise due to parasite reflections in the optical system. Calibration aims also particularly at compensating for fibers physical characteristics heterogeneity, notably allowing determining injection and collection rates per fiber.

In certain applications, precision required for enabling accurate detection of an optical fiber in a bundle is inferior to a micrometer. Thus, any modification such as the replacement of a connector between the bundle and the scanning device, any unwanted displacement of the connector due to a shock or any modification with regard to the configuration in which the system has been calibrated may require renewing geometrical detection of the fibers and become cumbersome. Multiplying images acquisition for calibration purposes may be a burden for a medical specialist. Therefore, the present disclosure presents a new method and a related apparatus for processing an image acquired through a guide that overcome the aforementioned technical limitations.

SUMMARY OF THE CLAIMED SUBJECT MATTER

According to one aspect, embodiments described herein relate to a method to process an image acquired through an optical-fiber guide including acquiring a recalibration image through the optical-fiber guide, determining a geometrical transformation to make the recalibration image coincide with a first reference image derived from a first image acquired through the optical-fiber guide in a preliminary stage, deriving from the geometrical transformation and from a stored first detection map spatially identifying each fiber of the optical-fiber guide on a second calibration image acquired in the preliminary stage, a new detection map spatially identifying each fiber of the optical-fiber guide on the recalibration image, and processing individually zones of the acquired image corresponding to each fiber of the optical-fiber guide using the new detection map.

In another aspect, embodiments disclosed herein relate to an image acquisition apparatus including a guide comprising at least one optical fiber, a light source, a scanning device making the light source scanning a proximal end of the guide, a detection unit to detect an image acquired through the guide, a processing device to acquire and process an image comprising a storage unit to store data, wherein said processing device is adapted to determine a geometrical transformation to make a recalibration image acquired through the guide coincide with a first reference image) being derived from a first image acquired in a preliminary stage, to derive from said transformation and from a stored first detection map identifying spatially each fiber of the guide on a second calibration image acquired in the preliminary stage, a new detection map identifying spatially each fiber of the guide on the recalibration image and to process individually zones of the acquired image corresponding to each optical fiber using said new detection map.

In another aspect, embodiments disclosed herein relate to an image acquisition apparatus including a guide consisting of a plurality of optical fibers, a light source emitting light, a direct imaging device focusing the light source on a proximal end of the guide, a detection unit to detect an image acquired through the guide, a processing device to acquire and process an image comprising a storage unit to store data, wherein said processing device is adapted to determine a geometrical transformation to make a recalibration image acquired through the guide coincide with a first reference image being derived from a first image acquired in a preliminary stage, to derive from said transformation and from a stored first detection map identifying spatially each fiber of the guide on a second calibration image acquired in the preliminary stage, a new detection map identifying spatially each fiber of the guide on the recalibration image, and to process individually zones of the acquired image corresponding to each optical fiber using said new detection map.

In another aspect, embodiments disclosed herein relate to a method to process an image acquired through an optical-fiber guide including acquiring a first reference image through the optical-fiber guide, acquiring a second calibration image through the optical-fiber guide, spatially identifying each fiber of the optical-fiber guide of the second calibration image in a first detection map, acquiring a recalibration image through the optical-fiber guide, determining a geometrical transformation to make the recalibration image coincide with the first reference image, deriving a new detection map spatially identifying each fiber of the optical-fiber guide of the recalibration image, wherein the new detection map is derived using the geometrical transformation and the first detection map, and individually processing zones of an acquired image corresponding to each fiber of the optical-fiber guide using the new detection map.

BRIEF DESCRIPTION OF DRAWINGS

Features of the present disclosure will become more apparent from the following description in conjunction with the accompanying drawings.

DETAILED DESCRIPTION

Specific embodiments of the present disclosure will now be described in detail with reference to the accompanying Figures. Like elements in the various Figures may be denoted by like numerals for consistency.

Figure 1:
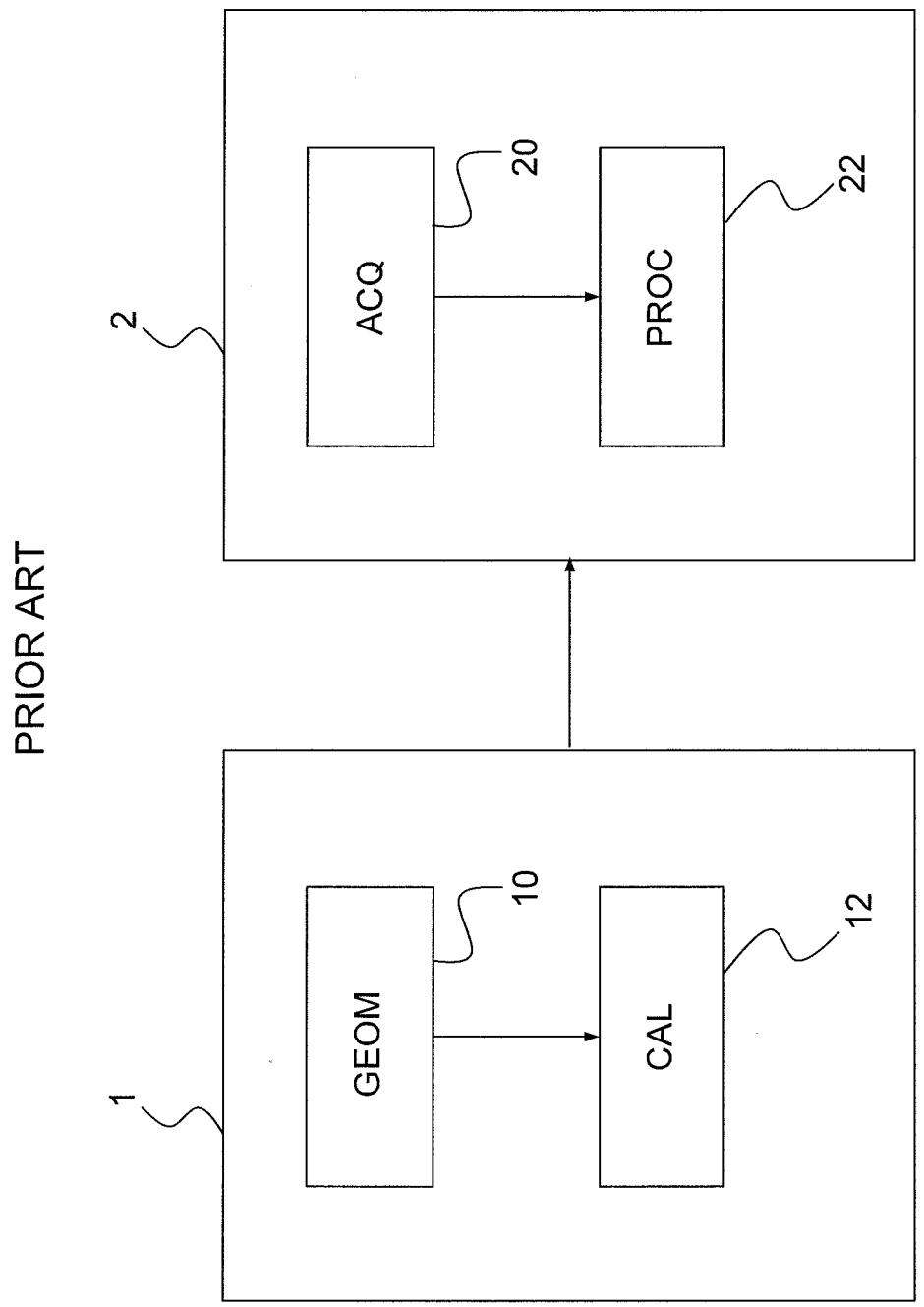
FIG. 1 is a global diagram of a method according to the prior art.

FIG. 1 shows a global diagram of a method for processing an image acquired through a guide consisting of a plurality of optical fibers according to the prior art. It comprises two stages: a calibration stage 1 and an operational stage 2. In the calibration stage 1, a geometrical calibration 10 is at first carried out. Geometrical calibration comprises detecting the fibers of the bundle on a calibration image so as to determine a correspondence between pixels of the calibration image and fibers of the bundle. Geometrical calibration may be obtained by processing an image acquired in a medium such that the pattern of the optical fibers is distinguished on the image. For example, in fluorescence imaging, such medium may be a fluorophore solution. Then, a radiometric calibration 12 may be carried out. Radiometric calibration 12 generally aims at determining per fiber injection rates in order to compensate for differences in the physical properties of the fibers. Radiometric calibration requires generally acquiring two images, a whitefield image and a blackfield image. For example, in the case of fluorescence imaging, a whitefield image may be acquired in a fluorophore homogeneous solution and a blackfield image may be acquired in a medium that will not reflect or fluoresce light back, such as air or water. For example, in backscattering imaging, a whitefield image may be obtained by acquiring an image of a mirror. In the operational stage 2, an image is acquired in step 20 and in step 22, each group of pixels associated to an optical fiber is processed individually considering its corresponding specific properties such as per fiber whitefield and blackfield values.

Figure 2:
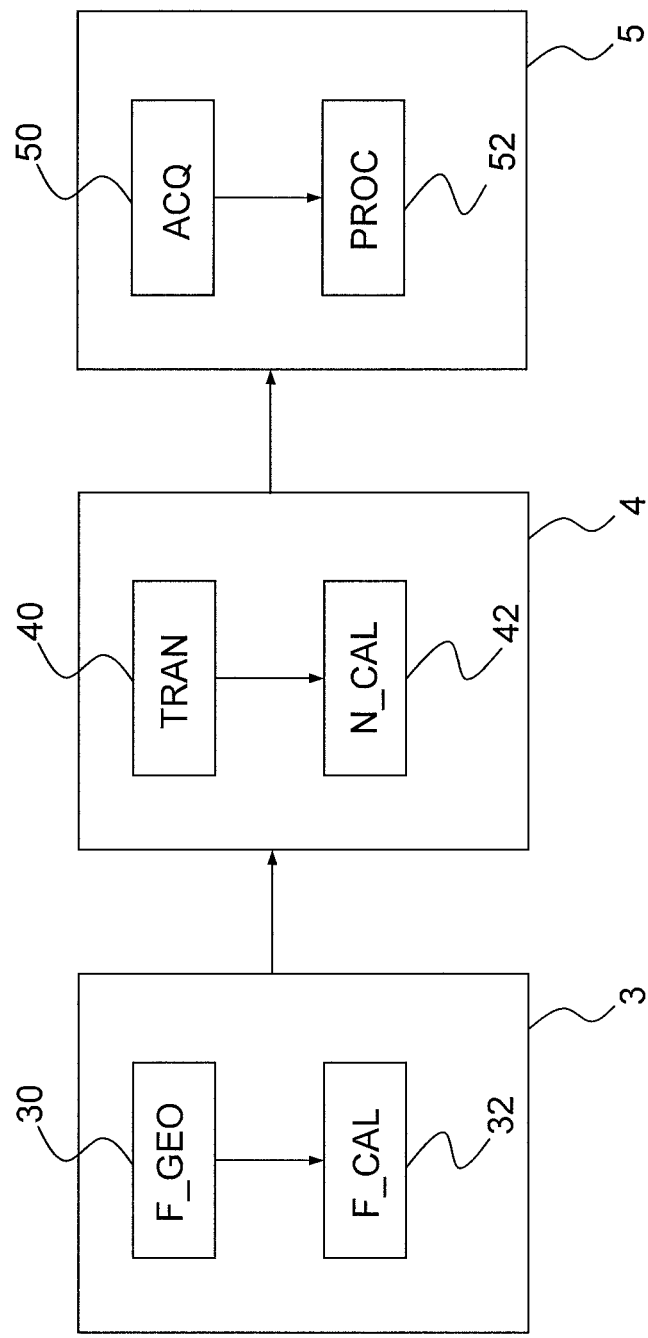
FIG. 2 is a global diagram of a method according to an embodiment of the present disclosure.

FIG. 2 represents a global diagram of a method for processing an image including a recalibration stage in accordance with embodiments disclosed herein. The method comprises: a preliminary calibration stage 3, a recalibration stage 4 and an operational stage 5.

Images acquired through the guide reveal the pattern of the fibers in the guide. In a preliminary stage, for example in the image guide manufacturing plant, a first detection map of the fibers in the guide might be determined for given conditions, for example in a certain medium, with a known light source and a determined connection between the guide and the light source. This first detection map may enable to associate each fiber of the guide with pixels of an image acquired in the preliminary stage. In an operational stage, by acquiring a recalibration image and by determining a geometrical transformation that make the pattern of the fibers on said recalibration image coincide with the pattern of a first reference image derived from a first image acquired in the preliminary stage conditions, one may detect, for example, a modification in the spatial arrangement of the fibers in the guide. The first reference image may be the first image. Alternatively, the first reference image may be derived from the first image. For example, the first reference image may be reconstructed from stored data related to the first image such as the fiber center coordinates and/or fiber physical properties. The operational stage notably enables to determine a new detection map, associating each fiber of the guide to pixels of the recalibration image. Further, this new detection map may be used for processing an image acquired in the operational stage conditions.

Preliminary stage 3 comprises two steps: a fine geometrical calibration step 30 and a fine radiometric calibration step 32. Steps 30 and 32 are similar to step 10 and 12 of the prior art. In certain embodiments, steps 30 and 32 may be performed on high-resolution images of the bundle. Using high-resolution images may improve fiber detection and may ease further processing (e.g., registration). Such images may be obtained by registering a plurality of standard resolution images covering the whole bundle in order to reconstruct a super-resolution image.

Fine geometric calibration 30 aims at spatially identifying the fibers, detecting the fibers in the bundle so as to determine a correspondence between the pixels of the image and the fibers of the bundle. This correspondence may be obtained by processing a second calibration image acquired in a medium such that the pattern of the optical fibers is more easily distinguished. For example, in the case of fluorescence imaging, such medium may be a homogeneous fluorophore solution.

Fine radiometric calibration 32 aims notably at determining per fiber calibration coefficients such as injection rates in order to compensate for differences in the physical properties of the fibers. Injection rates may be derived from whitefield values. Fine radiometric calibration 32 requires generally to acquire two reference images, a third blackfield reference image in order to determine a per fiber background signal calibration and a fourth whitefield reference image in order to determine the heterogeneous properties of the fibers. Per fiber background signal may be derived from blackfield values. In the case of fluorescence imaging, a whitefield image may be obtained by acquiring an image in an homogenous medium such as homogeneous fluorophore solution and a blackfield image may be obtained by acquiring an image in an absorbent medium such as air. For example, in backscattering imaging, a whitefield image may be obtained by acquiring an image of a mirror. In the case of fluorescence imaging, blackfield signal may notably be caused by fiber autofluorescence. Alternatively, when the second calibration image is a whitefield image, it may be possible to use the second calibration image in step 32. Data enabling to retrieve fine geometric and radiometric calibration may be stored. Injection rates may be derived from whitefield and blackfield values. More precisely, per fiber injection rates may be determined by subtracting the whitefield and black field values associated with a given fiber.

Recalibration stage 4 comprises a transformation calculation step 40 and a new calibration step 42. Transformation calculation step 40 is aimed at determining if the positioning of the fibers in the bundle has been modified with regard to preliminary stage 3. Step 40 may be conducted by estimating a transformation between the first reference image acquired in preliminary stage 1 and the recalibration image acquired in recalibration stage 4. In an embodiment, the recalibration image is a blackfield image. In an embodiment the first reference image is derived from one of the second calibration image, the third blackfield reference image and the fourth whitefield reference image. As previously mentioned, in an embodiment, the first reference image is the calibration image. In another embodiment, the first reference image is reconstructed from the first detection map which is derived from the second calibration image. This notably enables to store a smaller amount of data. In the case of fluorescence imaging, the recalibration image may be an image acquired in air. In another embodiment, the recalibration image may be any non saturated image on which the fibers are distinguishable. New calibration stage 42 derives from the previously determined transformation and from fine geometric calibration step 30 a new correspondence between the pixels of the image and the fibers of the bundle. Further details will be discussed below.

In the operational stage 5, an image is acquired in step 50. In step 52, according to the new correspondence between the pixels and the fibers, each group of pixels associated to an optical fiber is processed individually considering the specific properties of each fiber i.e. the calibration coefficients determined in fine radiometric calibration step 32.

Figure 3:
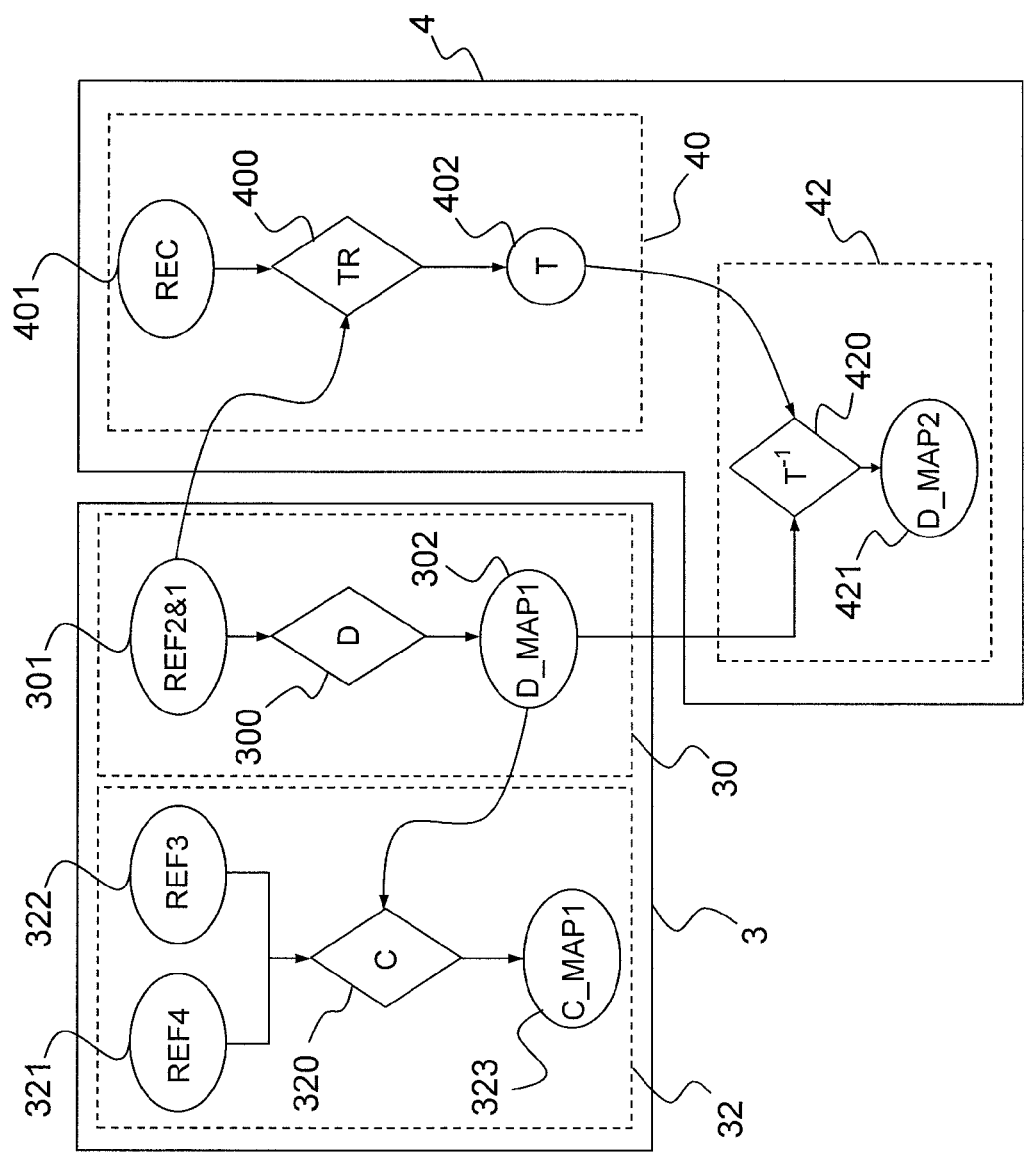
FIG. 3 represents schematically several stages of a method including recalibration according to an embodiment of the present disclosure.

FIG. 3 details previously described preliminary stage 3 and recalibration stage 4. In step 30, fibers detection 300 is operated on the second calibration image 301. Second calibration image 301 is obtained such that the pattern of the optical fibers is distinguished. Second calibration image 301 may be a high resolution whitefield image of the fibers reconstructed from a plurality of partial whitefield images of the bundle. Fibers detection leads to the first detection map 302 spatially identifying each fiber of the guide on calibration image 301. First detection map 302 may be a correspondence between pixels of the calibration image 301 and fibers of the bundle. First detection map 302 may be a list of fibers centers positions which enables to retrieve said correspondence.

The pattern of the fibers may locally have a hexagonal fiber arrangement. In an embodiment, the geometric calibration aiming at fiber detection can be improved by applying a specific preprocessing. Indeed the two dimensional spectrum of an ideal hexagonal fiber arrangement with intercore distance c is concentrated around a corona centered on frequency $f=2/(c*sqrt(3))$, as a result a noisy fiber image might be enhanced and denoised by applying a bandpass filter centered on f. This may advantageously make the detection step easier and more robust.

In step 32, the third blackfield reference image 322 of the guide, the fourth whitefield reference image 321, and the first detection map 302 are processed in a per fiber calibration step 320 in order to determine calibration coefficients per fiber. Calibration coefficients may include whitefield and blackfield values per fiber. Processing third blackfield reference image 322 and detection map 302 enables to determine per fiber blackfield values. This may enable also to take into account parasite effects per fiber such as reflections on the optics of the acquisition system, offset and/or the electronic noise due to the digitizing chain of the acquisition system. In fluorescence imaging, per fiber blackfield values may include fibers autofluorescence. Processing fourth whitefield reference image 321 and detection map 302 allows determining the heterogeneous properties of the fibers. This processing may comprise determining whitefield values per fiber. In an embodiment, fourth whitefield reference image 321 and second calibration image 301 may be identical. In an embodiment, at least one of second calibration, third blackfield and fourth whitefield reference images may be high resolution images and may be obtained by registering several partial high resolution images covering the whole bundle. This may notably enable to obtain super resolution images and to have a precise calibration and/or first detection map in the preliminary stage. Per fiber calibration step 320 leads to calibration map 323. Calibration map 323 may be a correspondence between fibers of the bundle and calibration coefficients. Calibration coefficients enable determining standard flux levels per fiber that may be used to adjust the flux of an acquired image in order to compensate for parasite effects and/or heterogeneous properties of the fibers. Calibration coefficients may be stored on an independent memory. Such memory may be a few bytes per fiber. According to an embodiment, calibration coefficients may comprise the spatial coordinates of the fibers, blackfield and whitefield values each coded in 4 bytes floating precision number, resulting in 16 bytes per fiber coding. Per fiber calibration coefficient may comprise per fiber injection rate. Per fiber injection rates may result from the subtraction of the per fiber whitefield and blackfield values.

In step 40, the recalibration image 401 is acquired. Recalibration image 401 may be a blackfield image. In fluorescence imaging, such image may be acquired in an absorbent medium for example water or air. This may enable to acquire recalibration images easily since the image guide may be stored in a way to be in contact with air. Recalibration images may then be acquired automatically upon activation of the system without requiring further manipulation. Recalibration image 401 may also be acquired automatically when the user launches a recalibration process, when the system detects that the connection between the bundle and the scanning device has been modified, for example after a shock or after a probe replacement. In such cases, the recalibration image could be any image acquired where the fibers are distinguishable. Recalibration image 401 may also be acquired automatically when a user modifies the scanning device configuration, for example when changing a field of view of the scanning device. In step 400, the first reference image acquired in the preliminary stage and recalibration image 401 are registered and the geometrical transformation 402 that makes said images coincide is determined. Notably, in the embodiment described on FIG. 3, second calibration image 301 is used in place of the first reference image. The first reference image may also be reconstructed from detection map 302 which may be stored on a storage unit of the processing device. In an embodiment, the first reference image may be a high resolution image and may be obtained by registering several partial high resolution images covering the whole bundle.

In fluorescence imaging, blackfield values of the fibers, reflecting mainly fibers autofluorescence, may temporally decrease when subjected to laser illumination. In order to alleviate the effect of the autofluorescence decrease on the quality of radiometric calibration in preliminary stage 3 or/and in recalibration stage 4, the optical guide may be pre-illuminated until fibers autofluorescence is stable. In an embodiment, a timer may be included in the image acquisition apparatus. The third blackfield reference image, the fourth whitefield reference image and the recalibration image may only be acquired after a predetermined time elapsed from the beginning of the fibers scanning. The predetermined time may be chosen for enabling fibers autofluorescence to be considered as stable after said predetermined time In step 420, a new detection map 421 is obtained by applying transformation 402 to first detection map 302. New detection map 421 is a correspondence between pixels of said recalibration image 401 and fibers of the bundle. New detection map 421 may be a list of fibers centers positions which enables to retrieve said correspondence.

Figure 4:
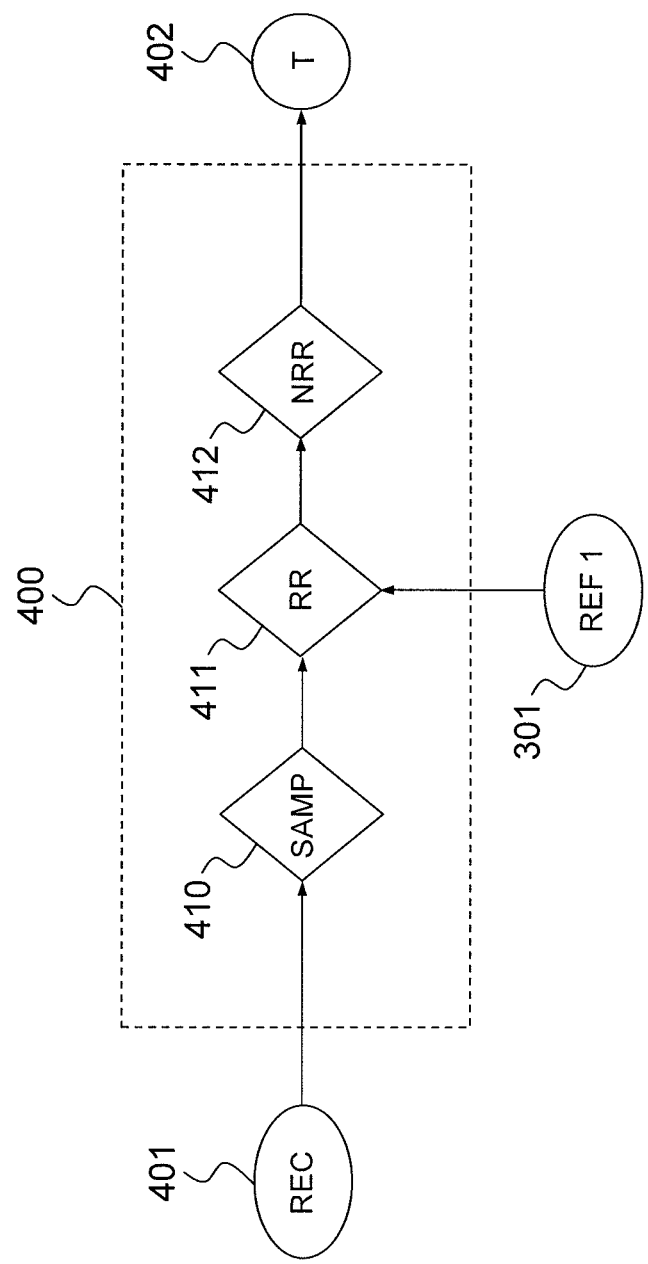
FIG. 4 represents schematically several stages of an image registration method used in an embodiment of the present disclosure.

FIG. 4 details step 400 of calculation of transformation 402. In step 410, recalibration image 401 is re-sampled in the space coordinate systems of the first reference image, initializing the coordinates to center the recalibration image 401 on the first reference image.

In step 411, a rigid registration is conducted on the first reference image and the recalibration image 401. Rigid registration consists in finding a rotation that makes both images coincide. The best rotation being the one that maximizes intercorrelation between the two images. In order not to choose a local maximum of the intercorrelation, an exhaustive search may be carried out using all the rotation and translation parameters close to the expected transformation. An expected transformation can be derived from system mechanics, optical alignment precision and scanning precision knowledge. In an embodiment the center of image 401 is placed on the center of the first reference image, with no rotation.

In step 412, a non rigid registration is carried out by block matching first reference image on recalibration image 401 resampled in step 410. Transformation 402 is deduced therefrom by interpolation methods. Block matching enables to complete) previous non rigid registration. Block matching idea is to consider that a group of pixels in a zone has a local displacement that may be regarded as a translation. Block matching method aims at calculating a displacement field between two images by local region matching techniques. Images are divided in several blocks which are compared from an image to another by intercorrelation. The position of the intercorrelation maximum provides the value of the displacement of one block to another. The displacement field may then be interpolated and extrapolated in order to obtain transformation over the whole image space.

In step 42, the inverse of transformation 402 is applied to detection map 302 to produce new detection map 421 that matched pixels from recalibration image 401 to the fibers.

Figure 5:
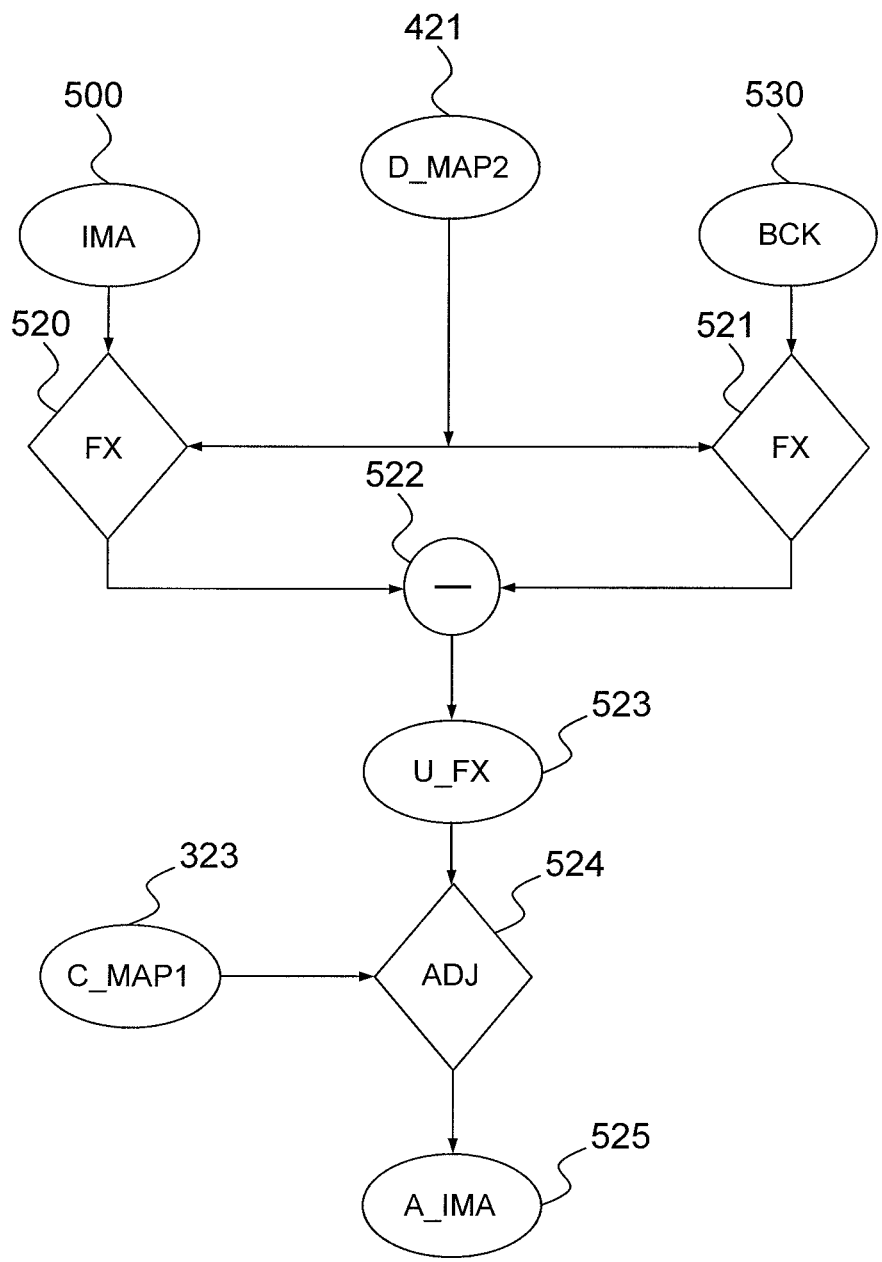
FIG. 5 is a general diagram of a method for processing an image acquired through a guide consisting of a plurality of optical fibers according to an embodiment of the present disclosure.

FIG. 5 is a general diagram of a method for processing an image acquired through a guide consisting of a plurality of optical fibers adapted to an embodiment of the present disclosure. Processing the image notably enables to remove the background noise from the acquired image and to compensate for the heterogeneities of each fiber. From an acquired image 500, photon flux seen by each fiber is calculated in stage 520 using new detection map 421. In step 521, the photon flux seen by each fiber is also determined for a blackfield image 530 using new detection map 421 thus leading to new blackfield values. In an embodiment, the blackfield image 530 is the recalibration image. In stage 522, a subtraction of the new blackfield value for each fiber is carried out. The result of the subtraction is an image 523 representing, for each zone corresponding to a given optical fiber, a useable photon flux. An optional bias correction stage may be carried out on the image 523. Adjustment step 524 receives on the one hand the corrected image 523 and on the other hand the calibration map 323 so as to carry out a calibration operation, dividing for each fiber the corrected flux of the observed object by corresponding standard fluxes per fiber. The corresponding standard flux is the standard flux of the fiber to which said fiber corresponds according to new detection map 421. The standard flux of the fiber is also previously referred to as per fiber injection rate. Step 524 leads to adjusted image 525.

The output power of the light source illuminating the optical fiber guide may be modified. This may enable, for example, to compensate for a saturation of the system caused by an intense emission of the object under observation. As previously mentioned, in the recalibration stage, new blackfield values may be determined from the recalibration image to accurately compensate the background noise on the acquired image of interest. When the modification of the light source output power occurs after the recalibration step, new blackfield values may be adapted dynamically by considering that the new blackfield value of each fiber is proportional to the light source power. The photon flux seen by each fiber determined in step 521 is therefore scaled according to the light source power. In an embodiment, the whitefield values determined during the preliminary stage are also dynamically adapted.

In one embodiment, the signal of a pixel of the adjusted image corresponding to a given fiber of the bundle may be given by:

$$I_{adjusted} = \frac{I_x - I_2}{I_1 - I_3} \quad \text{(Eq. 1)}$$

wherein:
$I_x$ is the pixel signal measured on the acquired image,
$I_1$ is the corresponding fiber whitefield signal derived from the fourth whitefield image,
$I_2$ is the pixel new blackfield signal derived from the recalibration image when said recalibration image is a blackfield image,
$I_3$ is the corresponding fiber blackfield signal derived from the third blackfield reference image.

Figure 6:
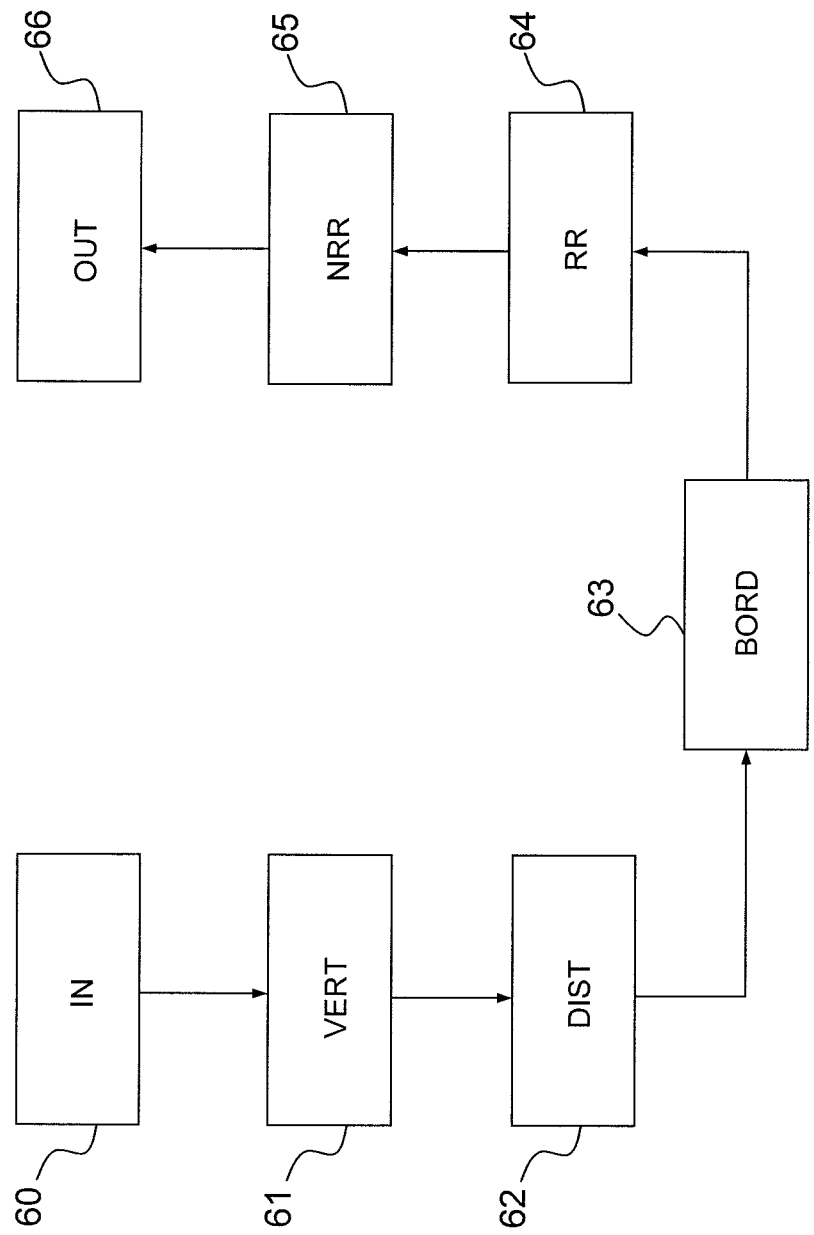
FIG. 6 is a global diagram of a method for obtaining high resolution images of a bundle according to an embodiment of the present disclosure.

FIG. 6 describes several steps for obtaining a high resolution image of a bundle from a plurality of high resolution partial images. These steps may be implemented particularly for obtaining second calibration, third blackfield and fourth whitefield reference images with high resolution. In an embodiment, high resolution images are directly acquired by the system. These steps may also be implemented for obtaining the first reference image.

Figure 7:
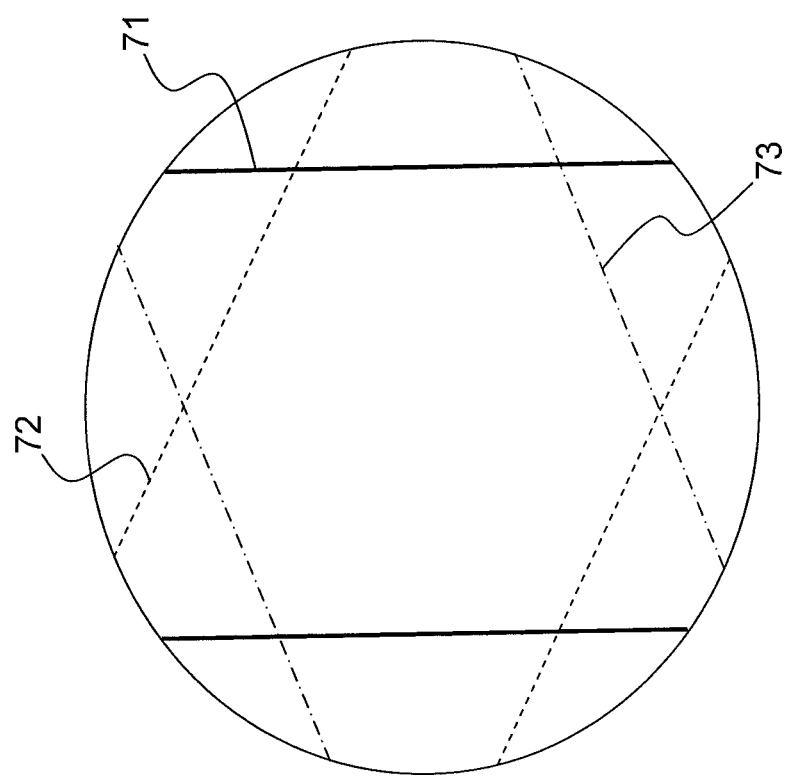
FIG. 7 is an example of partial images for high resolution reconstruction of a bundle image according to an embodiment of the present disclosure.
Figure 8:
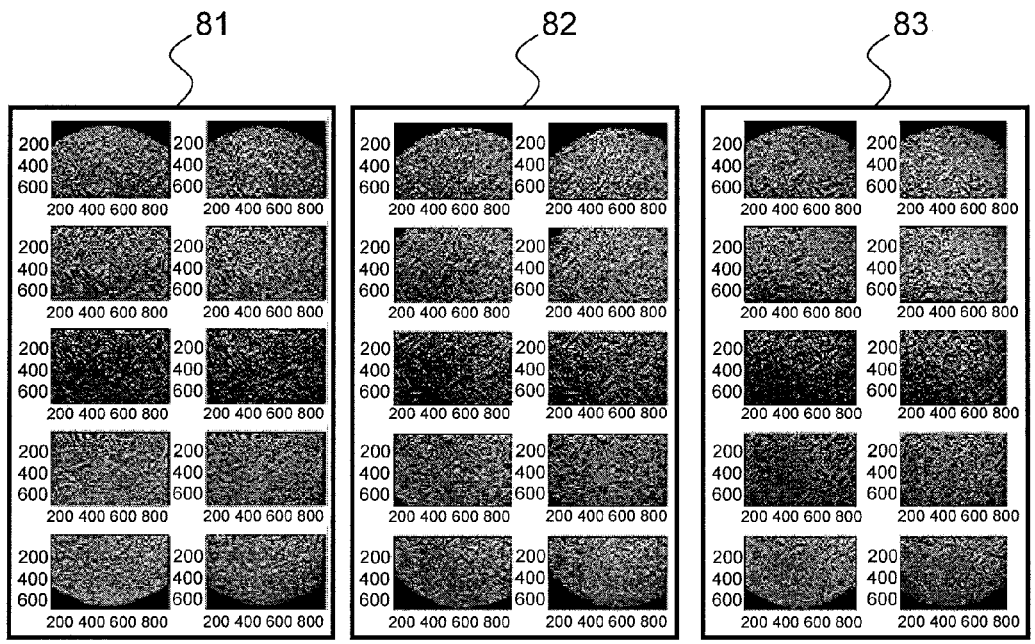
FIG. 8 is a set of partial acquisitions of whitefield and blackfield images according to an embodiment of the present disclosure.

In step 60, a plurality of partial images of the bundle are obtained. Slices of the bundle may be acquired in several parts. Those partial images may be obtained by modifying the scanning of the bundle proximal end. Indeed, when the imaging device reduces its scanning field, a better resolution is obtained. Thus, partial images of better resolution than a whole image of the bundle are obtained and enable getting a high resolution image of the whole bundle through registration methods. FIG. 7 illustrates an example of three slices of a bundle that may be taken in order to reconstruct a high resolution image of the whole bundle. The three slices are acquired in three directions in order to cover the whole bundle. In the embodiment described, the three directions are 0°, 120° and 240°, corresponding slices are hereinafter referred as slice 1, slice 2 and slice 3 and are represented on FIG. 7 under reference 71, 72 and 73. FIG. 8 illustrates three slices of a bundle, each slices being acquired in five vertical parts, for both a blackfield image and a whitefield image. References 81, 82 and 83 on FIG. 8 correspond to slice 1, slice 2 and slice 3 for both a whitefield image and a blackfield image.

Figure 9:
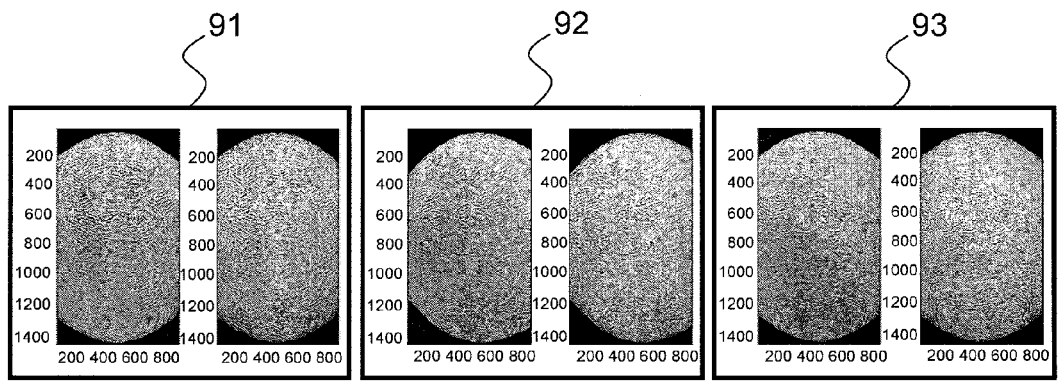
FIG. 9 shows previous set of partial acquisitions after vertical reconstruction stage according to an embodiment of the present disclosure.

Step 61 is a vertical reconstruction of the bundle slices. FIG. 9 illustrates the result of vertical reconstruction of the slices vertical parts. Vertical reconstruction is operated by intercorrelating successive vertical slice parts. References 91, 92 and 93 on FIG. 9 correspond to slice 1, slice 2 and slice 3 for both the whitefield image and the blackfield image after vertical reconstruction.

Figure 10:
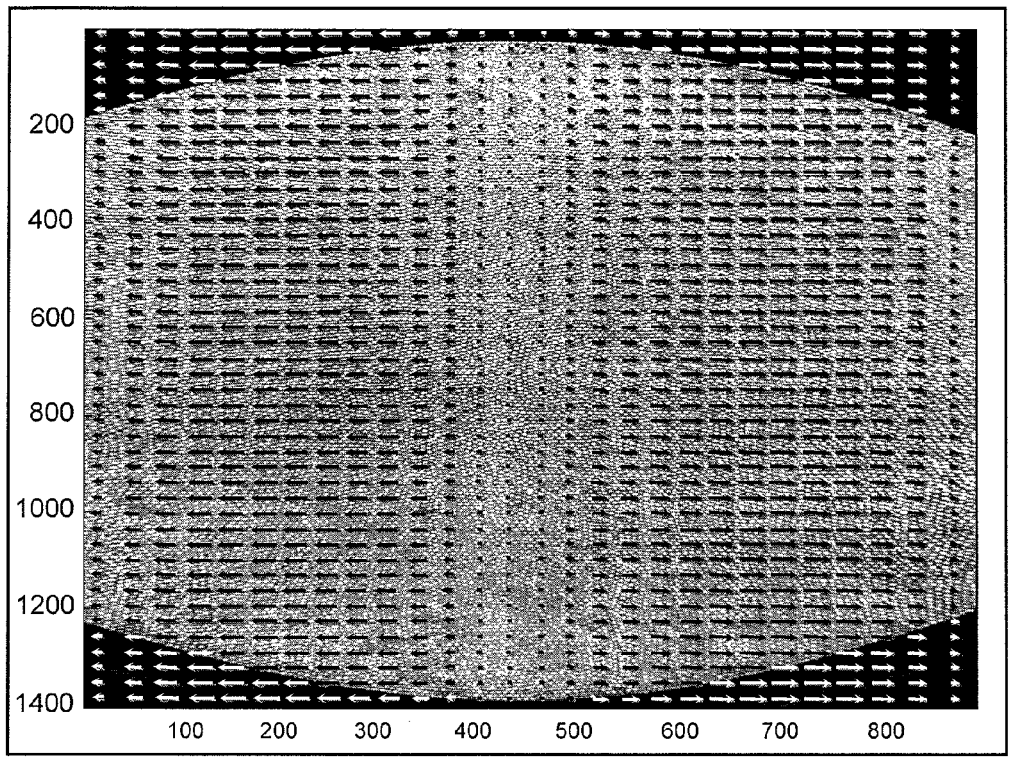
FIG. 10 illustrates a field of distortion on an acquired image according to an embodiment of the present disclosure.

Step 62 consists in a correction of the distortions. FIG. 10 represents a typical field of distortions on an image acquired with the bundle. Scanning devices may trigger distortions on acquired images. In order to compensate for these distortions, a re-sampling of the image may be operated relatively to a model of distortion. The model may be a calibrated sinusoidal model in the case of a scanning device using a sinusoidal oscillating mirror.

Figure 11:
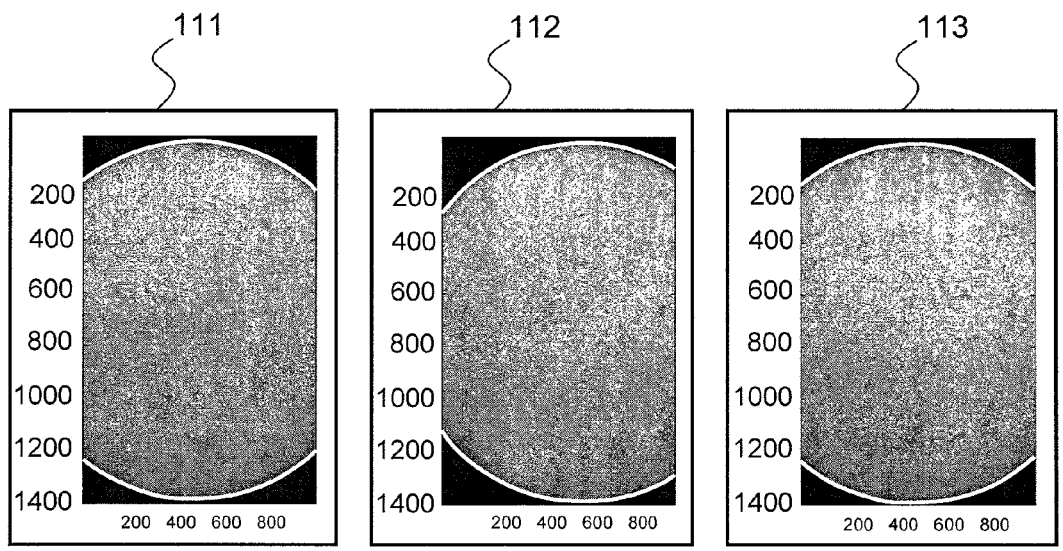
FIG. 11 is a result of a border detection on previous set of partial acquisitions according to an embodiment of the present disclosure.

Step 63 consists in detecting the border and the center of the bundle of each slice. In step 63, the bundle may be considered circular. For each slice, finding the center enables to obtain centered images and permits to use the center of the bundle as a transformation center for further rigid registration. In order to find the bundle center, a Hough algorithm may be used. In order to do so, a border detection may be first carried out by using Canny filters and turning the slices into binary images in which the blackfield value is equal to zero and the value inside the circle is equal to one. This step may involve morphologic cleaning operations to eliminate defects. FIG. 11 represents an example result of step 63. References 111, 112 and 113 correspond to slices 1, 2 and 3 on FIG. 11 after border detection.

Figure 12:
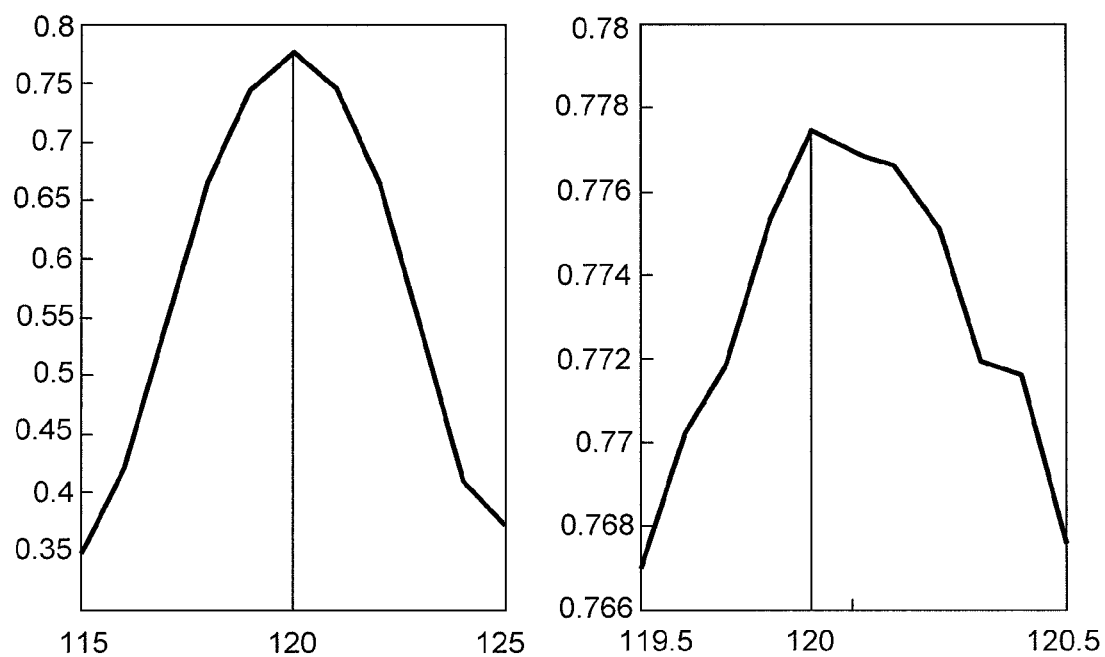
FIG. 12 illustrates autocorrelation maximum search in rigid registration according to an embodiment of the present disclosure.
Figure 13:
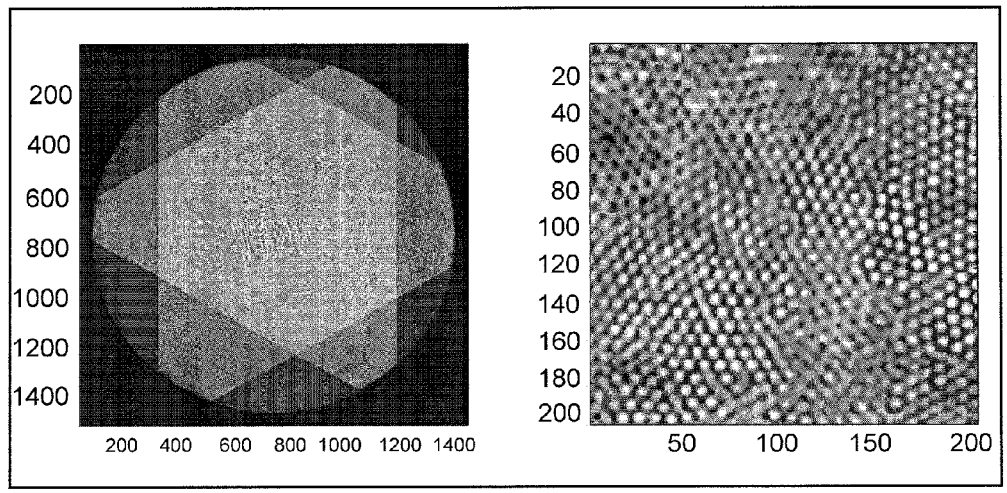
FIG. 13 illustrates a reconstructed image from previous set of partial acquisitions after rigid registration according to an embodiment of the present disclosure.

Step 64 consists in rigid registration of the slices. In the described embodiment rigid registration aims at registering three slices of an image, for both a whitefield image and a blackfield image. For two slices, rigid registration consists in finding a rotation and a translation that makes the slices coincide. The best rotation and translation being the ones that maximizes intercorrelation between the two slices. In order not to choose a local maximum of intercorrelation, an exhaustive search may be carried out. FIG. 12 illustrates intercorrelation values for different rotations between two slices. After the best rotation has been identified, a translation that makes the two slices coincide is determined. FIG. 13 illustrates an image of the bundle after rigid registration. Blurred parts on FIG. 13 highlight that the registration is not completely satisfying at that stage.

Figure 14:
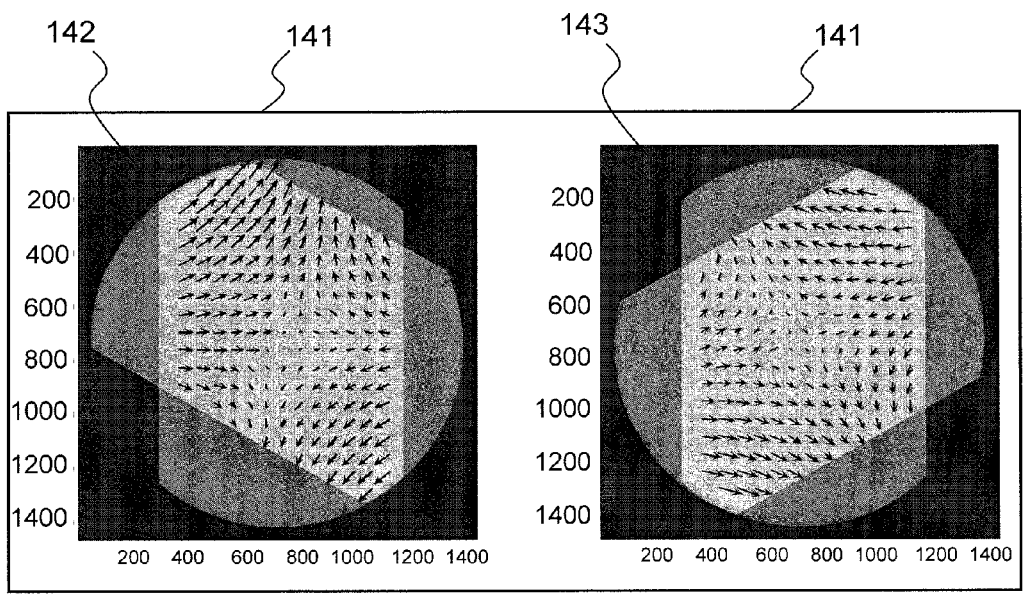
FIG. 14 illustrates a field of displacements between common parts of several partial images according to an embodiment of the present disclosure.

Step 65 consists in non rigid registration of the slices by block matching. FIG. 14 illustrates the field of displacements obtained in block matching slice 1 on slice 2 and slice 3 on slice 1. References 141, 142 and 143 correspond alternatively to slices 1, 2 and 3 on FIG. 14 after block matching. Multi scale block matching may also be used in order to improve the results, Multi scale block matching consists in iterating block matching and progressively reducing the size of the blocks.

Interpolation of the displacement field may be carried out using thin plate spline interpolation technique. Thin plate spline interpolation enables to calculate a transformation for each point of an image given at least three pairs of centers and displacements. Block matching provides the coordinates of the centers and the displacements. Then, an inversion method enables to determine the spline coefficients of each center. In an embodiment, B-Spline interpolation may be used in order to reduce execution time. In order to do so, thin plate spline transformation may be applied to a regular grid and a cubic spline transformation may be derived from the new field of displacements obtained therefrom. Cubic spline interpolation may be then used to reconstruct the image.

As the whole bundle is reconstructed from three slices, registration of slice 2 on slice 1 and slice 3 on slice 1 may not give a satisfactory result. Registering slice 2 on slice 3 may also be needed.

Figure 15:
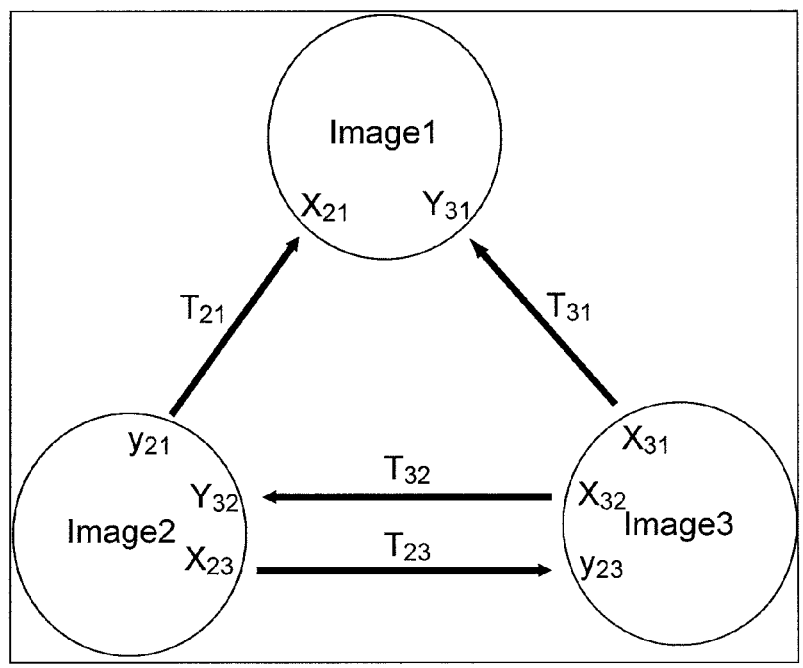
FIG. 15 illustrates schematically a method to register three partial images according to an embodiment of the present disclosure.

FIG. 15 illustrates a method for carrying out a full registration with three slices in an embodiment of the present disclosure. Referring to FIG. 15, $T_{21}$, $T_{31}$, $T_{23}$ and $T_{32}$ are the transformations obtained by interpolating alternatively the results of block matching of slice 2 on slice 1, of slice 3 on slice 1, of slice 2 on slice 3 and of slice 3 on slice 2. Corresponding sets of transformations centers and transformed centers for each block of the block matching are respectively referred to as $x_{21}$, $x_{31}$, $x_{23}$, $x_{32}$ and $y_{21}$, $y_{31}$, $y_{23}$, $y_{32}$. Final transformations $T_2$ and $T_3$ enabling to accurately register slice 2 on slice 1 and slice 3 on slice 1 should verify:

$T_2=T_{21}$: the direct transformation but also $T_2=T_{23}$ o $T_3$ when composing the two other block matching from image I2 to I3, and then I3 to I1. Also, $T_3=T_{31}$ and $T_3=T_{32}$ o $T_2$.

Transformation $T_2$ and $T_3$ may respectively be defined from center sets $x_{21} \cup x_{23}$ and $x_{31} \cup x_{32}$. Corresponding displacements may match the following relations that depends on the overlaps defined for each transformation:

$$T_2(x_{21}|x_{23}) = T_{21}(x_{21}|x_{23}) \quad \text{(Eq. 2)}$$

$$T_2(x_{23}|x_{21}) = T_3(T_{23}(x_{23}|x_{21})) \quad \text{(Eq. 3)}$$

$$T_2(x_{21} \cap x_{31}) = \tfrac{1}{2} * [T_{21}(x_{21} \cap x_{23}) + T_3(T_{23}(x_{21} \cap x_{23}))] \quad \text{(Eq. 4)}$$

(average transformation on the common point set)

$$T_3(x_{31}|x_{32}) = T_{31}(x_{31}|x_{32}) \quad \text{(Eq. 5)}$$

$$T_3(x_{32}|x_{31}) = T_2(T_{32}(x_{32}|x_{31})) \quad \text{(Eq. 6)}$$

$$T_3(x_{31} \cap x_{32}) = \tfrac{1}{2} * [T_{31}(x_{31} \cap x_{32}) + T_2(T_{32}(x_{31} \cap x_{32}))] \quad \text{(Eq. 7)}$$

(average transformation on the common point set)

Figure 16:
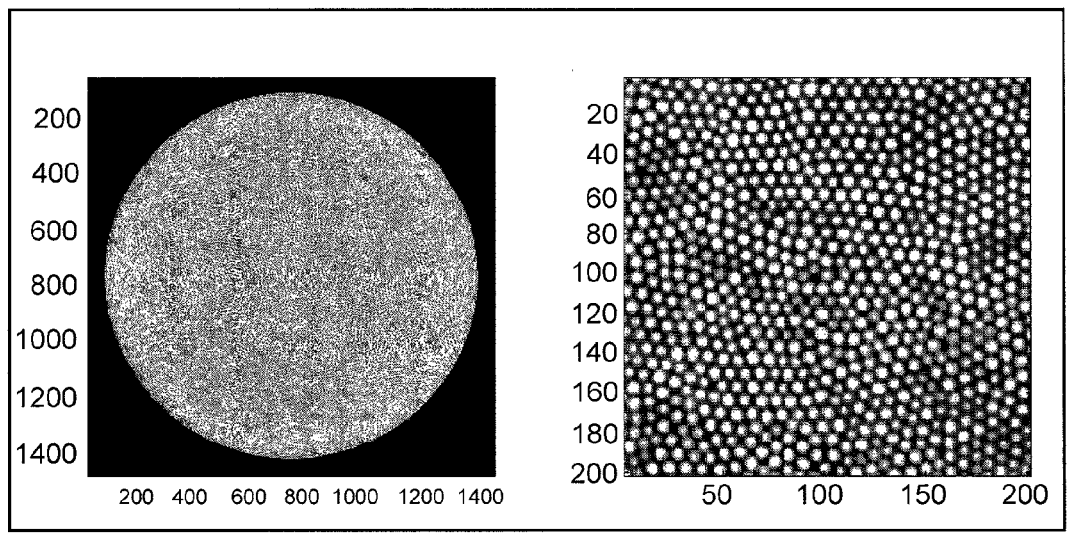
FIG. 16 is an image of a bundle after a block matching method according to an embodiment of the present disclosure.
Figure 17:
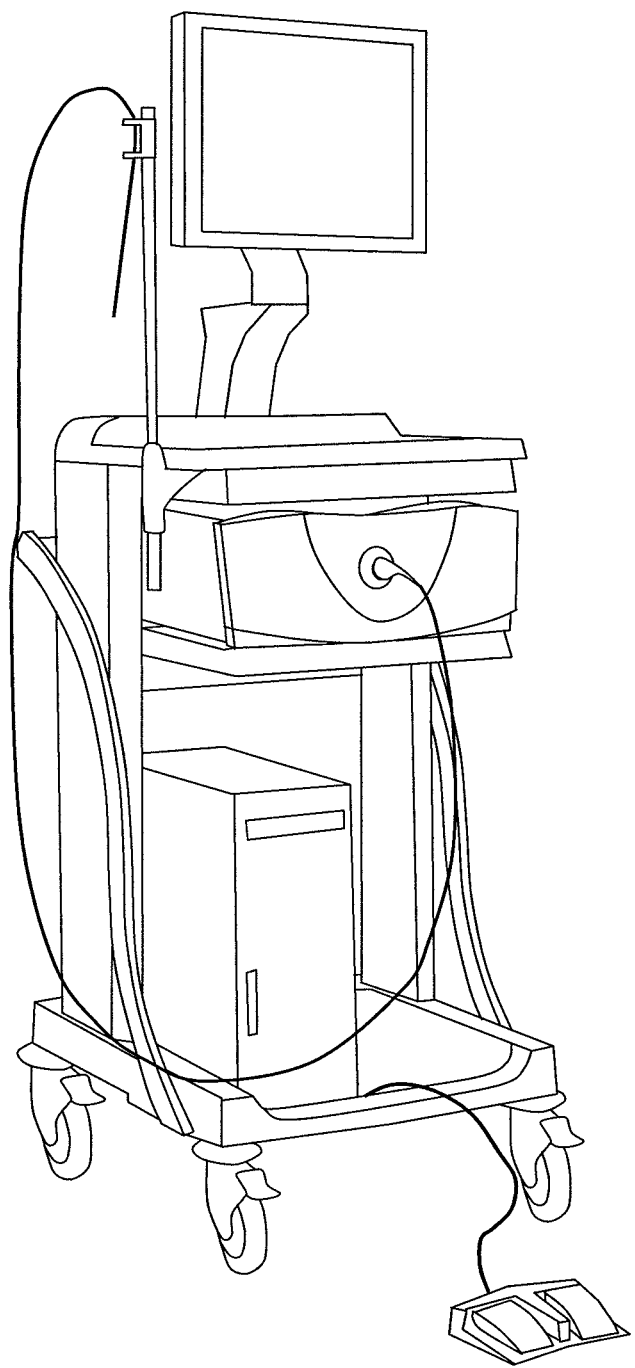
FIG. 17 is an image of an apparatus according to an embodiment of the present disclosure.

Transformations $T_2$ and $T_3$ are coupled, $T_2$ and $T_3$ calculations converge after a few iterations. FIG. 16 illustrates an image of a bundle registered from three slices according to the previously described method as obtained in step 66.

In an embodiment, when acquiring several slices from both a whitefield image and a blackfield image, the transformation may be calculated on the whitefield image and applied on the blackfield image. In another embodiment, in order to correct potential defects, the blackfield image is preliminarily registered on the whitefield image.

In an embodiment, bundle image intensity is smoothed before rigid registration. The bundle image is divided by the smoothed version and multiplied by a median intensity value. Using the same median intensity value for the different slices enable to correct intensity deviation from one slice to another.

In an embodiment, a system is adapted to use several wavelengths. The system may include a light source that comprises several multiplexed wavelengths. When all light sources are multiplexed, and share the same optical axis, and all channels have the same optical aberrations and distortions, then the same calibration image for geometrical calibration can be used. Each wavelength produces its own whitefield and blackfield, but they all share the same geometry of the calibration image to locate each fiber.

In fluorescence imaging, using several sources of different wavelengths may enable to excite several fluorophores in the observed object. Fluorophores may have specific properties such as being linked to a certain kind of tissue in an organism. As fluorophores generally have a spread emission spectrum, separated collection channels corresponding to different spectral sub-band may be implemented in order to approximately isolate light emitted by each fluorophore. Therefore, each collection channel may lead to a spectral sub-band image related to the light emitted by a specific fluorophore. The spectral sub-band images may be obtained by collecting light emitted from an observed entity on a plurality of collection channels. The plurality of spectral sub-band images obtained may enable to better visualize properties of an object under observation.

In an embodiment of the present disclosure, the acquired image to be processed may comprise a plurality of spectral sub-band images obtained by collecting light emitted from an observed object on a plurality of collection channels, said plurality of collection channel corresponding to a plurality of spectral sub-bands.

In an embodiment, all channels share the same optical axis, the same optical aberrations and distortions. Therefore, a single geometrical calibration may be performed for the plurality of partial spectral images so that zones of the partial spectral images corresponding to each fiber of the optical fiber guide may be determined using the new detection map as disclosed hereinabove.

As the properties of the fibers may vary with the wavelength of the light injected in the fibers, the radiometric calibration may be adapted and whitefield and blackfield values may be determined on each spectral sub-band corresponding to each collection channel. More precisely, for a spectral sub-band, whitefield and blackfield values of the fibers may be determined in order to obtain the injection rates of the fibers on said spectral sub-band. In order to do so, the third blackfield reference image may comprise a plurality of spectral sub-band blackfield images and the fourth whitefield reference image may comprise a plurality of spectral sub-band whitefield images acquired on the plurality of collection channels. On each spectral sub-band, the injection rate of a fiber may be obtained by subtracting the blackfield value of the spectral sub-band blackfield image from the whitefield value of the spectral sub-band whitefield image on the given spectral sub-band.

In order to accurately cancel the background noise on each spectral sub-band image to be processed, the recalibration image may also comprise a plurality of spectral sub-band recalibration images. Considering the injection rates on the spectral sub-bands and the plurality of spectral sub-band recalibration images, the process described with reference to FIG. 5 may be implemented independently on each spectral sub-band images.

In a further embodiment, the light source illuminating the fibers may comprise a plurality of secondary light sources. As a light source might affect several channels, preliminary stage can be carried out independently for each collection channel with all secondary light sources on. Concerning the processing method and referring to FIG. 5, the blackfield image 530, or the recalibration image when the recalibration image is a blackfield image, might be acquired with all light sources on or might be recomputed from a set of secondary blackfield images, each acquired with only one light source on. With the latter solution, when the power output of one light source is modified, the flux of the secondary blackfield image corresponding to the light source whose power has been modified is scaled according to the light source power output, and a modified blackfield image 530 for the channel is computed by summing the flux of the secondary blackfield images corresponding to the secondary light sources whose power ouput has not been modified and the flux of the tuned secondary blackfield image.

While the disclosure has been presented with respect to a limited number of embodiments, those skilled in the art, having benefit of this disclosure, will appreciate that other embodiments may be devised which do not depart from the scope of the present disclosure. Particularly, the fiber bundle may be used in different systems analyzing light emitted from an object. Light emitted may notably be backscattered by the object or may result from fluorescence. Accordingly, the scope of the invention should be limited only by the attached claims.

The invention claimed is:

1. A method to process an image acquired through an optical-fiber guide, the method comprising:
    acquiring a recalibration image through the optical-fiber guide;

determining a geometrical transformation to make the recalibration image coincide with a first reference image derived from a first image acquired through the optical-fiber guide in a preliminary stage;

deriving from the geometrical transformation and from a stored first detection map spatially identifying each fiber of the optical-fiber guide on a second calibration image acquired in the preliminary stage, a new detection map spatially identifying each fiber of the optical-fiber guide on the recalibration image; and processing individually zones of the acquired image corresponding to each fiber of the optical-fiber guide using the new detection map.

2. The method of claim 1, wherein the first reference image is the first image acquired through the optical-fiber guide, the first image being stored in the preliminary stage.

3. The method according to claim 2, wherein the first image is the second calibration image.

4. The method of claim 3, wherein the first reference image is reconstructed from the first detection map.

5. The method according to claim 1, wherein in the preliminary stage a calibration map associating each fiber of the optical-fiber guide to calibration coefficients is stored, and wherein the zones of the acquired image corresponding to each optical fiber are processed individually using the calibration coefficients.

6. The method according to claim 5, wherein the calibration coefficients are per fiber whitefield values and/or per fiber blackfield values and are derived from a third blackfield reference image, from a fourth whitefield reference image and from the first detection map.

7. The method of claim 6, wherein acquiring an image through the optical-fiber guide comprises the step of illuminating the fibers with at least one light source and wherein a predetermined time elapses between a beginning of the illuminating step and acquiring at least one of the third blackfield reference image, the fourth whitefield reference image and the recalibration image.

8. The method of claim 6, wherein:
the recalibration image is a blackfield image and a useable flux per pixel is calculated by subtracting the flux of the recalibration image pixels from the flux of the acquired image corresponding pixels;
the per fiber whitefield and blackfield values enable to determine a standard flux per fiber; and
the processing comprises dividing the useable flux of a pixel of the acquired image by the standard flux of the fiber to which the pixel corresponds according to the new detection map.

9. The method of claim 8, wherein acquiring an image through the optical-fiber guide comprises the step of illuminating the fibers with a light source and wherein a modification of an output power of the light source after the step of acquiring the recalibration image is compensated by scaling the flux of the recalibration image pixels.

10. The method of claim 6, wherein the second calibration image is a whitefield image and is used in place of the fourth whitefield reference image.

11. The method of claim 1, wherein the recalibration image is acquired in air.

12. The method of claim 1, wherein the first reference image is of a higher resolution than the recalibration image.

13. The method of claim 6, wherein at least one of the first reference image, second calibration image, third blackfield reference image and fourth whitefield reference image is an high resolution image obtained by making a plurality of partial high resolution images coincide.

14. The method of claim 1, wherein the determination of a transformation to make the first reference image and the recalibration image coincide comprises:
correcting distortions on the recalibration image;
re-sampling the recalibration image on the first reference image;
rigid registration of the first reference and recalibration images; and
non-rigid registration of the first reference and recalibration images.

15. The method of claim 13, wherein the partial images are centered and cover the whole optical-fiber guide, and wherein the making the plurality of partial images of the optical-fiber guide coincide comprises:
correcting distortions in the partial images;
detecting the center of the optical-fiber guide in the partial images;
rigid registration of the partial images on a reference image; and
non-rigid registration of the partial images on a reference image.

16. An image acquisition apparatus, comprising:
a guide comprising at least one optical fiber;
a light source;
a scanning device making the light source scanning a proximal end of the guide,
a detection unit to detect an image acquired through the guide,
a processing device to acquire and process an image comprising a storage unit to store data,
wherein said processing device is adapted to:
determine a geometrical transformation to make a recalibration image acquired through the guide coincide with a first reference image being derived from a first image acquired in a preliminary stage;
derive from said transformation and from a stored first detection map identifying spatially each fiber of the guide on a second calibration image acquired in the preliminary stage, a new detection map identifying spatially each fiber of the guide on the recalibration image;
process individually zones of the acquired image corresponding to each optical fiber using said new detection map.

17. An image acquisition apparatus comprising:
a guide consisting of a plurality of optical fibers,
a light source emitting light,
a direct imaging device focusing the light source on a proximal end of the guide,
a detection unit to detect an image acquired through the guide,
a processing device to acquire and process an image comprising a storage unit to store data,
wherein said processing device is adapted to:
determine a geometrical transformation to make a recalibration image acquired through the guide coincide with a first reference image being derived from a first image acquired in a preliminary stage;
derive from said transformation and from a stored first detection map identifying spatially each fiber of the guide on a second calibration image acquired in the preliminary stage, a new detection map identifying spatially each fiber of the guide on the recalibration image;
process individually zones of the acquired image corresponding to each optical fiber using said new detection map.

18. The apparatus according to claim 17, wherein said recalibration image is acquired automatically when the apparatus is turned on.

19. A method to process an image acquired through an optical-fiber guide, the method comprising:
- acquiring a first reference image through the optical-fiber guide;
- acquiring a second calibration image through the optical-fiber guide;
- spatially identifying each fiber of the optical-fiber guide of the second calibration image in a first detection map;
- acquiring a recalibration image through the optical-fiber guide;
- determining a geometrical transformation to make the recalibration image coincide with the first reference image;
- deriving a new detection map spatially identifying each fiber of the optical-fiber guide of the recalibration image, wherein the new detection map is derived using the geometrical transformation and the first detection map; and
- individually processing zones of an acquired image corresponding to each fiber of the optical-fiber guide using the new detection map.

20. The method according to claim 1, wherein:
- the acquired image comprises a plurality of spectral sub-band images obtained by collecting light emitted from an observed object on a plurality of collection channels, said collection channels corresponding to a spectral sub-band; and wherein
- the processing step is performed on the plurality of spectral sub-band images.

21. The method of claim 8, wherein:
- acquiring an image through the optical-fiber guide comprises the step of illuminating the fibers with a plurality of secondary light sources;
- the recalibration image is acquired by summing the fluxes of secondary blackfield images, said secondary blackfield images being obtained by illuminating the optical-fiber guide with a single secondary source on; and wherein
- a modification of an output power of a given secondary light source after the acquisition of the recalibration image is compensated by scaling the flux of the corresponding given secondary blackfield image in the sum of the fluxes of the secondary blackfield images.

22. The apparatus according to claim 16, wherein said recalibration image is acquired automatically when the apparatus is turned on.

* * * * *